April 19, 1938.   W. R. SIMONTON   2,114,323
STENCILING APPARATUS
Filed Aug. 25, 1936   7 Sheets-Sheet 1

INVENTOR.
W. R. Simonton.
BY
ATTORNEYS.

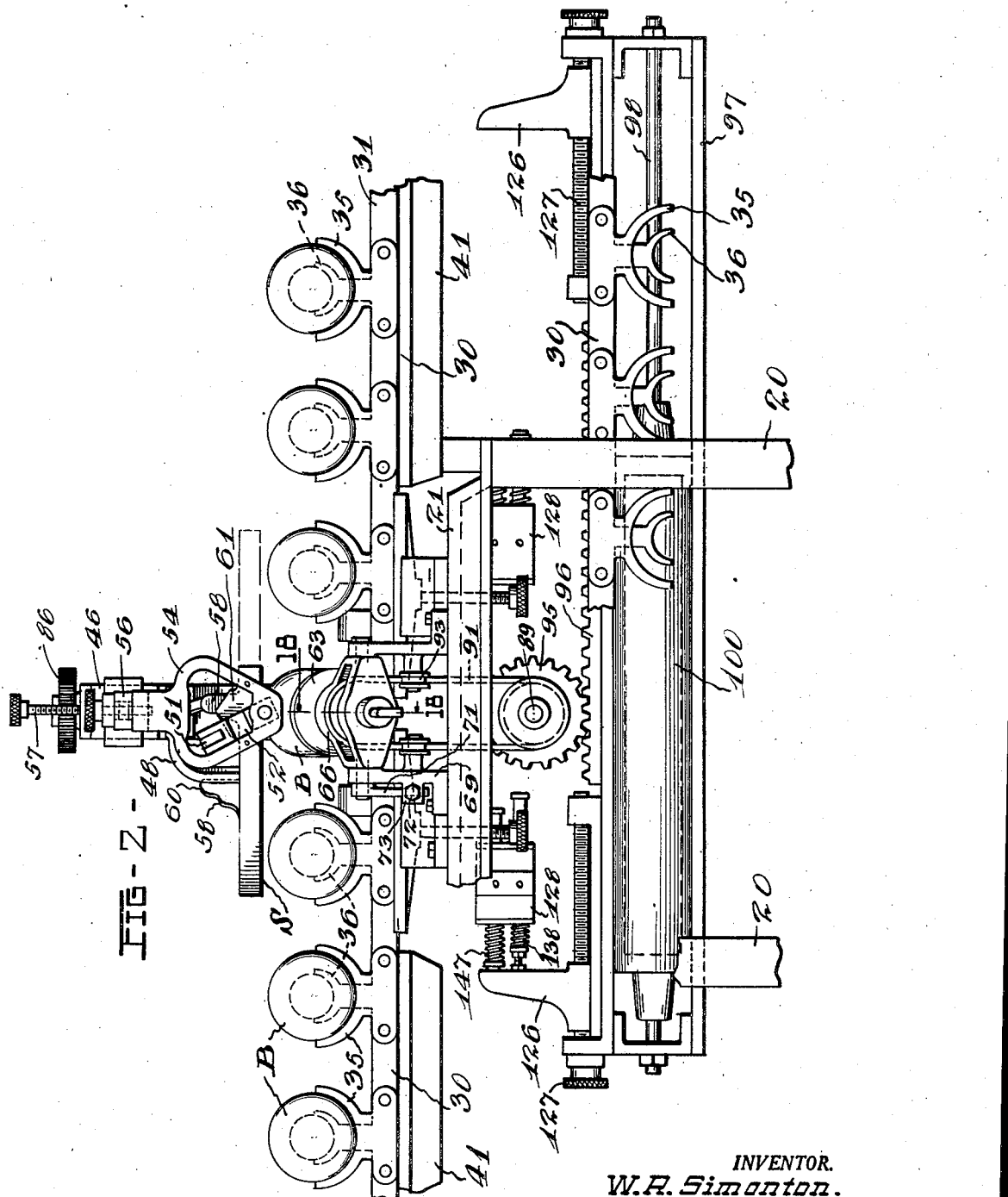

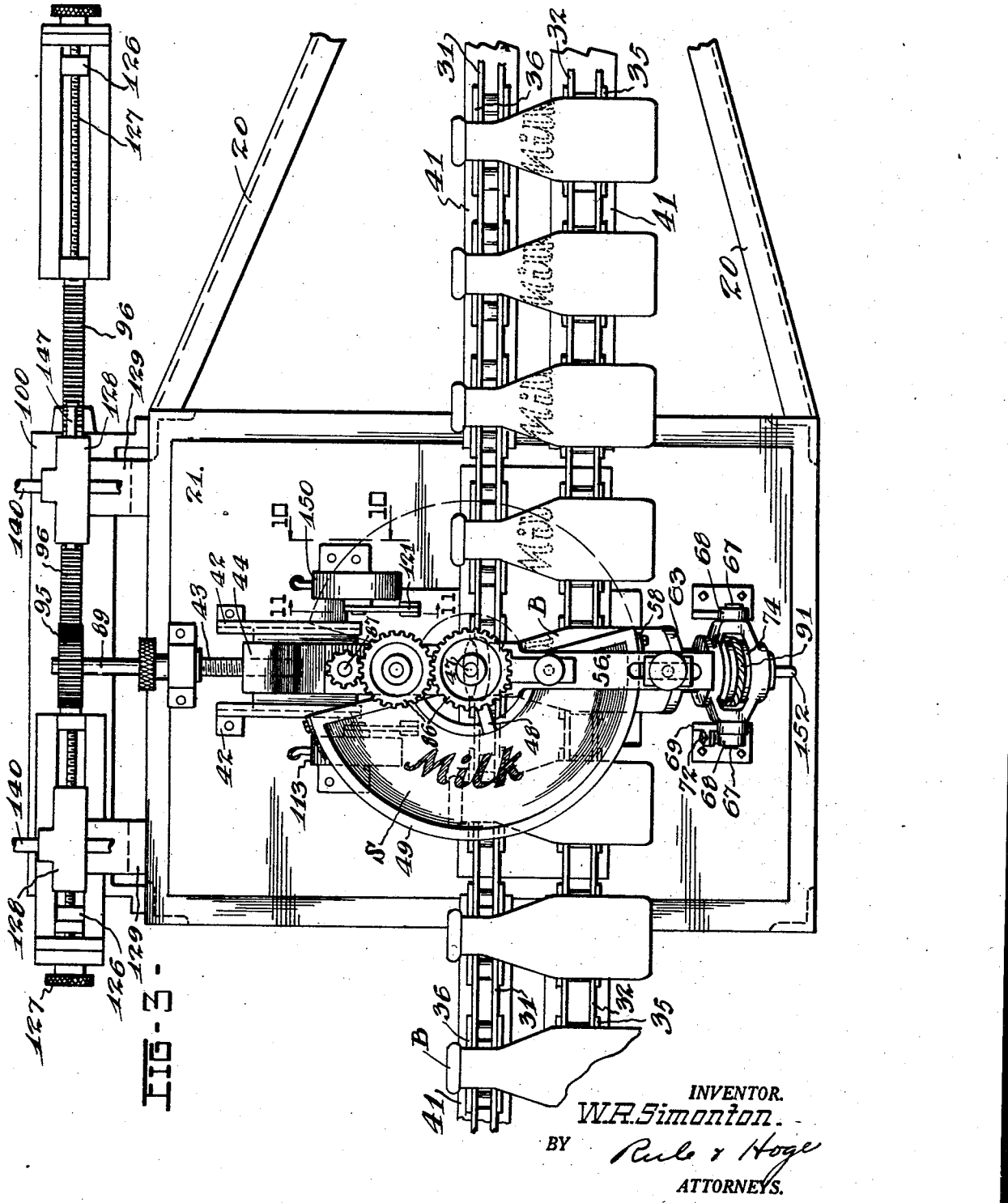

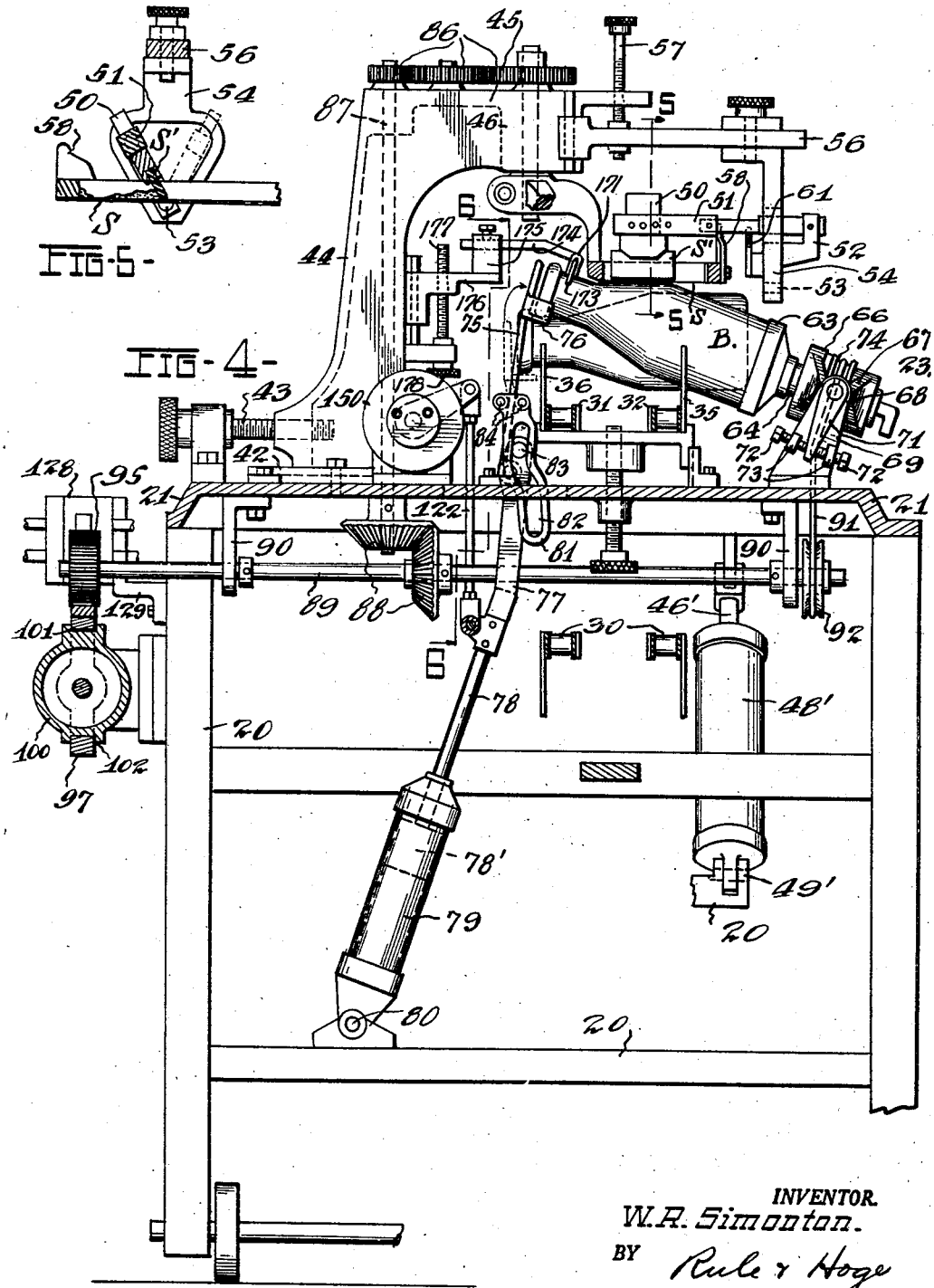

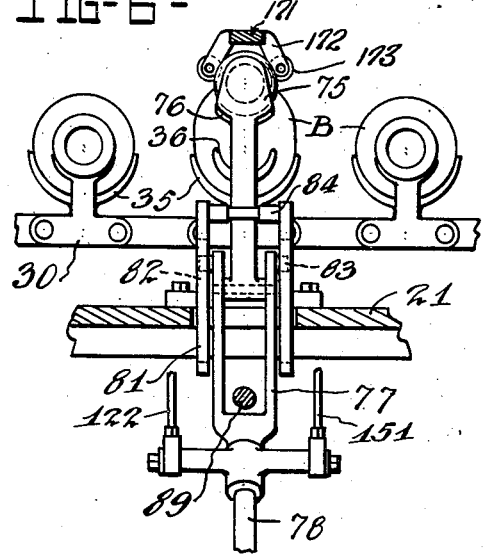
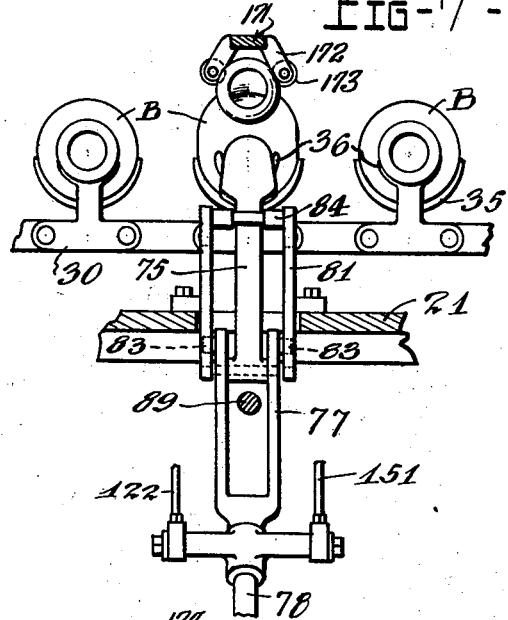
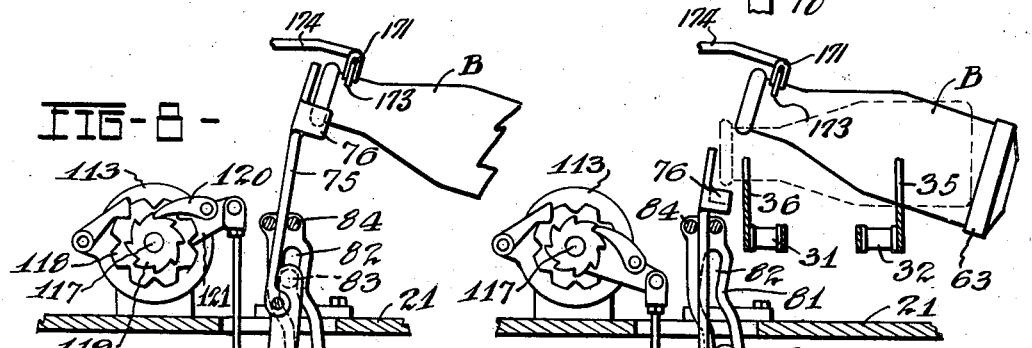
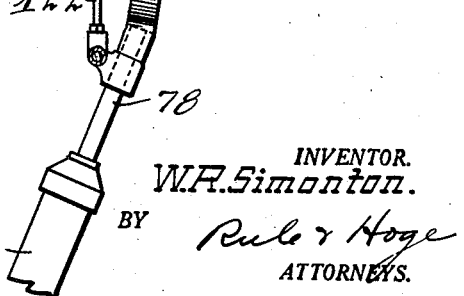

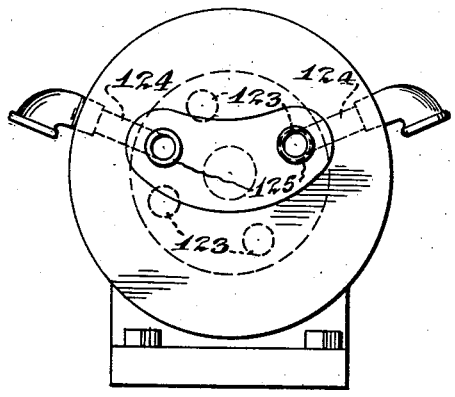
FIG-10-
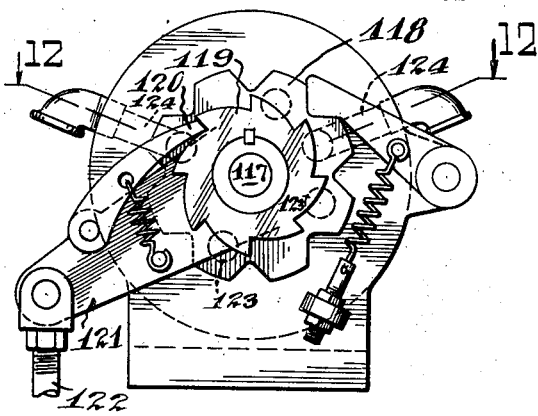
FIG-11-
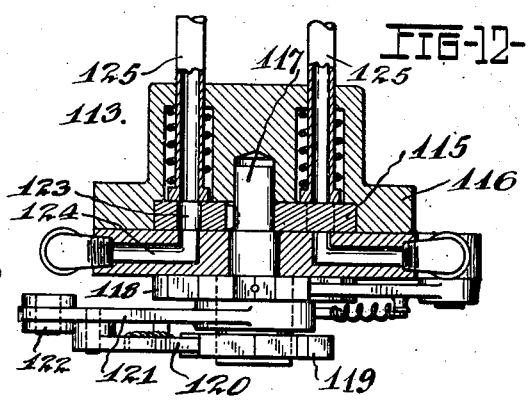
FIG-12-
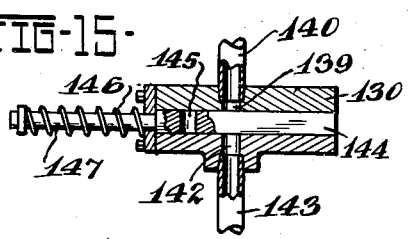
FIG-15-
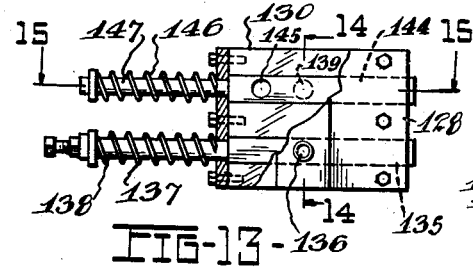
FIG-13-
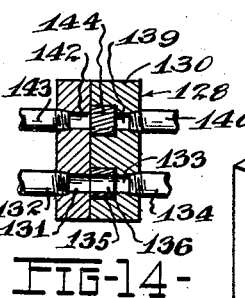
FIG-14-
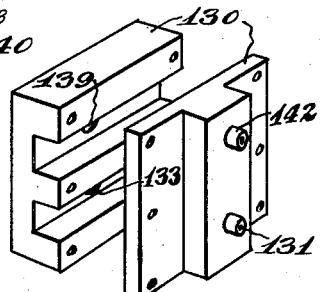
FIG-16-
INVENTOR.
W. R. Simonton.
BY
ATTORNEYS.

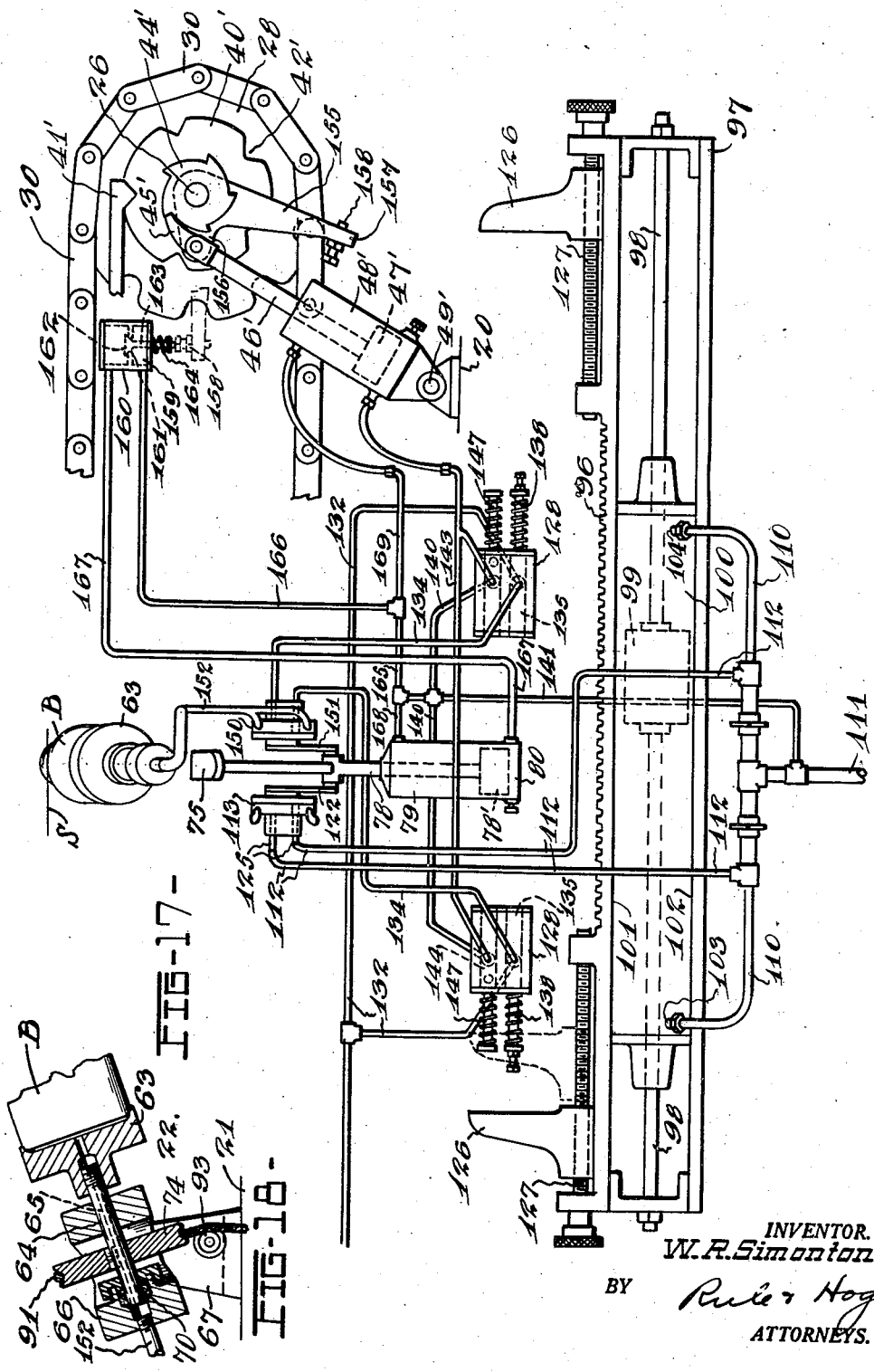

Patented Apr. 19, 1938

2,114,323

UNITED STATES PATENT OFFICE 2,114,323

STENCILING APPARATUS

Warren R. Simonton, Huntington, W. Va., assignor to Owens-Illinois Glass Company, a corporation of Ohio Application August 25, 1936, Serial No. 97,799

15 Claims. (Cl. 101—124)

The stenciling apparatus comprising the present invention is primarily adapted for use in applying a vitreous enamel composition or paint to articles of glassware such as bottles or the like, and to other articles of a vitreous or ceramic nature in the lettering or decorating thereof by a stenciling process. The apparatus is especially adapted for use in lettering or decorating the frusto-conical or tapered shoulder portions of milk bottles.

The principal object of the invention is to provide a fully automatic apparatus which will receive the undecorated milk bottles; convey them successively to a decorating station; orient the individual bottles at the decorating station for proper cooperation with the decorating instrumentalities, i. e., the stencil screen and squeegee; apply the decoration to the bottles; and convey the decorated bottles to a point of discharge.

Another object of the invention is to provide a stenciling apparatus of generally simplified and improved form which may be operated more rapidly than the various types of apparatus heretofore employed.

Other objects will be in part apparent and in part pointed out hereinafter.

In the accompanying drawings:

Fig. 2 is an enlarged fragmentary side elevational view of a portion of the apparatus in the vicinity of the actual stenciling instrumentalities, certain parts being broken away and others removed to more clearly reveal the nature of the invention;

Fig. 3 is an enlarged fragmentary top plan view of a portion of the apparatus in the vicinity of the stenciling instrumentalities;

Fig. 4 is a sectional view taken substantially along the line 4—4 of Fig. 1;

Fig. 5 is a sectional view taken substantially along the line 5—5 of Fig. 4;

Fig. 6 is a sectional view taken substantially along the line 6—6 of Fig. 4 and showing a bottle neck elevating mechanism employed in connection with the present invention in operative elevating position;

Fig. 7 is a sectional view similar to Fig. 6 showing the bottle neck elevating mechanism in its inoperative position;

Fig. 8 is a fragmentary elevational view, diagrammatic in its representation, of the detached bottle neck elevating mechanism in its operative elevating position together with a vacuum valve and indexing mechanism therefor employed in connection with the present invention;

Fig. 9 is a view similar to Fig. 8 showing the bottle neck elevating mechanism in its inoperative position;

Fig. 10 is a sectional view taken substantially along the line 10—10 of Fig. 3;

Fig. 11 is a sectional view taken substantially along the line 11—11 of Fig. 3;

Fig. 12 is a sectional view taken substantially along the line 12—12 of Fig. 11;

Fig. 13 is a detailed side elevational view of a control valve employed in connection with the present invention;

Fig. 14 is a sectional view taken substantially along the line 14—14 of Fig. 13;

Fig. 15 is a sectional view taken substantially along the line 15—15 of Fig. 13;

Fig. 16 is a perspective view of the casing of the control valve shown in Fig. 13;

Fig. 17 is a diagrammatic view showing the various pneumatic operating instrumentalities and connections therefor employed for obtaining full automatic operation of the apparatus; and Fig. 18 is a sectional view taken substantially along the line 18—18 of Fig. 2.

Figure 1:
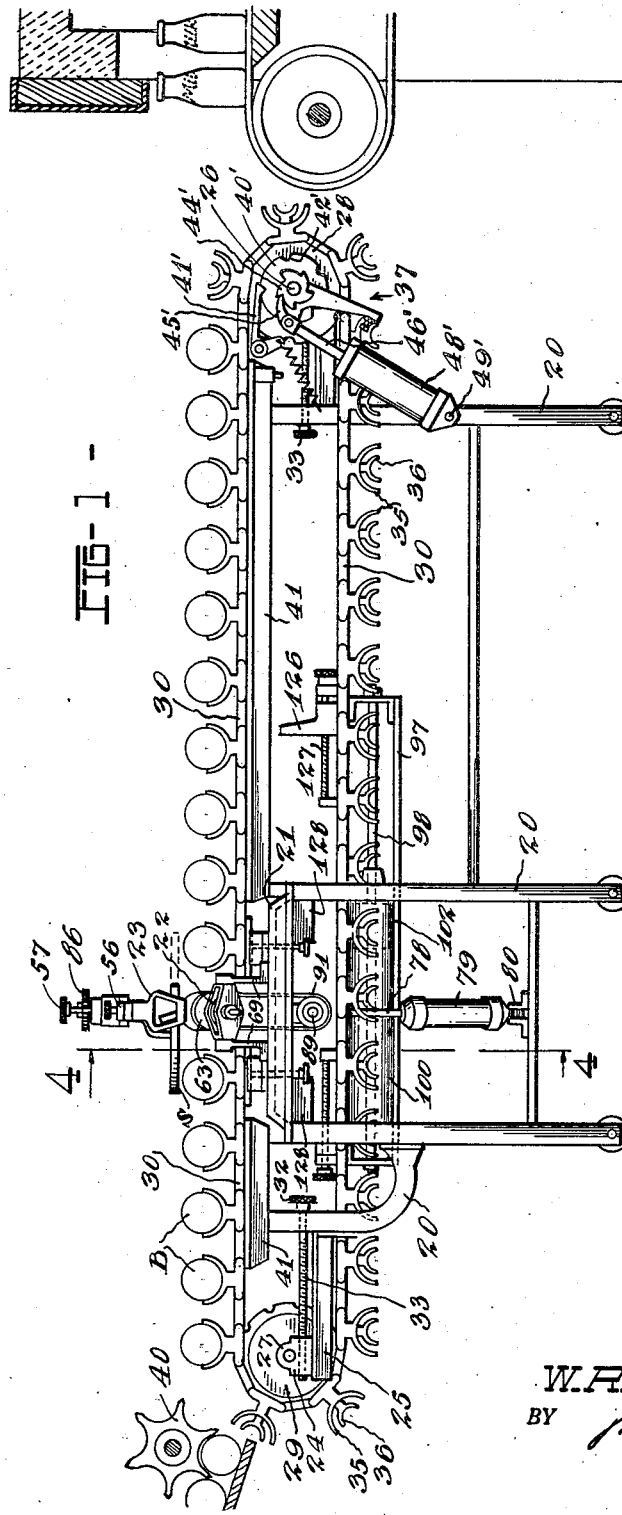
Fig. 1 is a side elevational view of a stenciling apparatus manufactured in accordance with the principles of the present invention.

Briefly, the apparatus includes a conveyor (Fig. 1) designed to receive bottles or similar containers at one end thereof in a cumbent or horizontal position. The conveyor is actuated intermittently and the bottles are advanced and successively positioned beneath a stencil screen. In the vicinity of the screen, the individual bottles are tilted or partially upended and supported in a rotary chuck which maintains the bottles in decorating position against the screen. Coloring material is forced through the screen and applied to the bottles by the spreading action of a squeegee upon synchronized oscillation of the screen with rotation of the bottles. The decorated bottles are subsequently released by the chuck and restored to their horizontal position in the conveyor from whence they are delivered in an upended position to an adjacent conveyor for further treatment, for example, drying or baking in a suitable oven.

Specifically, the apparatus includes a wheeled base 20, or frame (Fig. 1), carrying a platform 21, or table, by means of which a bottle chuck assembly 22 and a stencil screen and squeegee assembly 23 and parts directly associated therewith are supported in a manner presently to appear.

Supported in bearings 24, which are slidable longitudinally on supports 25, carried by the frame 20 at opposite ends thereof, are a driving shaft 26 and an idler shaft 27, upon which shafts are mounted a pair of conveyor driving wheels 28 and a pair of conveyor idler wheels 29 respectively. An endless conveyor 30 consisting of an inner endless chain 31 (Fig. 3) and an outer endless chain 32 is operatively disposed on the respective driving and idler wheels 28, 29. A pair of adjusting screws 33 (Fig. 1), extending through the frame 20 and bearings 24 at each end of the apparatus, permit longitudinal adjustment of the bearings 24 together with the driving and idler wheels 28 and 29 in order that any existing slack in the chains 31 and 32 may be taken up.

The bottles B, or other articles to be decorated, are supported on the conveyor 30 in a cumbent position by means of a plurality of cradle-like members 35 and 36, the members 35 being integrally formed on alternate links of the conveyor chain 32, and the members 36 being similarly formed on alternate links of the chain 31. The members 35 are designed to receive the main body portions of the bottles B near the centers of gravity of the bottles, while the members 36 are designed to receive the neck portions of the bottles. The bottles are fed to the conveyor 30 in a horizontal position by means of any suitable feeding mechanism 40.

The weight of the conveyor chains 31 and 32, together with the weight of the bottles supported thereon, is supported from the framework of the apparatus by means of horizontal slideways 41 disposed directly beneath the chains and upon which the latter slide.

The conveyor 30 is adapted to be intermittently actuated to bring the bottles B successively into position beneath the stencil screen by means of an indexing mechanism 37 in a manner presently to appear.

The indexing mechanism is best illustrated in Figs. 1 and 17 and consists of an indexing gear 40' mounted on the driving shaft 26 of the conveyor 30 and an indexing pawl 41' cooperating therewith. The gear 40' is provided with a plurality of peripheral notches 42' adapted to be successively engaged by the pawl 41' as the shaft 26 is intermittently actuated. The notches 42' are so arranged on the gear 40' that each indexing operation performed by the pawl 41' advances the conveyor a distance equal to the distance between the bottles B on the conveyor.

In order to actuate the conveyor, a driving ratchet wheel 44' is mounted on the shaft 26 and is adapted to be periodically moved by a spring pressed pawl 45' mounted on one end of a plunger 46'. A piston 47' is mounted on the other end of the plunger 46' and operates in a cylinder 48' which is pivoted as at 49' to a stationary portion of the framework 20 of the apparatus.

Slidably supported between guides 42 (Figs. 3 and 4) on the platform 21, and adjustable transversely thereon by means of an adjusting screw 43, is a vertical standard 44 provided with an overlying portion 45 having a hub 46 formed thereon. A shaft 47 extending through the hub 46 has a spider 48 affixed to its lower end. A sector-shaped screen frame 49 carrying a stencil screen S is secured to the support 48 and occupies a position directly above the position occupied by the particular bottle B to be decorated. The screen frame 49 and screen S are adapted to be oscillated about the axis of the shaft 47 in a manner and by a mechanism subsequently to be described.

In order to force coloring material through the screen S (Figs. 1, 4 and 5), a squeegee S' depends from a holder 50 adjustably mounted upon a horizontal squeegee arm 51. The arm 51 is pivoted at its inner end to a rockable bracket 52 which is pivoted by means of a hinge pin 53 to the lower end of a frame-like support 54, or yoke, provided with a substantially triangular opening 55 therein, through which the squeegee arm 51 extends. The yoke 54 is suspended from an arm 56 and is longitudinally adjustable thereon in order that, in the initial setting up of the apparatus, the squeegee S' may be properly positioned with respect to the surface of the articles to be decorated. The arm 56 is carried by the overlying portion 45 of the standard 44 and is vertically adjustable thereon by means of an adjusting screw 57. In order to rock the bracket 52 for the purpose of reversing the inclination of the squeegee S', a pair of lifting cams 58 (Figs. 2, 3 and 4) are mounted on the screen frame 49 adjacent the opposite ends of the same. The cams 58 are each provided with raised horizontal cam surfaces 59 which pass under the arm 51 and elevate the same slightly to lift the squeegee S' away from the screen and permit the coloring material thereon to pass under the squeegee and occupy a position ahead of the same upon reversal of the movement of the latter. Abutments 60 provided on the cams 58 serve to prevent the cams from passing completely under the squeegee arm 51. In order to maintain the squeegee holder and squeegee in either of its inclined positions, a stationary holding cam 61 is affixed to the yoke 54 and is provided with inclined cam surfaces 62 against which the arm 51 selectively bears in either of the inclined positions of the squeegee holder 50.

The bottle chuck assembly 22 (Figs. 1, 3 and 18) is mounted on the platform 21 in the vicinity of the stencil screen and squeegee assembly 23 and includes a cup-shaped chuck 63 having a shank 64 provided with an axial bore 65. The chuck 63 and shank 64 are rotatably supported in a cradle bearing 66 mounted on trunnions 67 which are supported in bearings 68 carried by a pair of brackets 69 which are bolted or otherwise secured to the platform 21 in spaced relationship. One of the trunnions 67 projects completely through its respective bracket 69 and has secured thereto a depending finger 71. A pair of adjusting screws 72 extending through ears 73 provided on one of the brackets 69 engages the finger 71 therebetween and permits adjustment of the inclination of the chuck 63. A pulley 74 is mounted on the shank 64 and is exposed through the cradle bearing 66 in the manner shown in Fig. 4.

The inner end of the shank 61 is connected through a fluid seal 70 to a source of low pressure or vacuum, the intermittent application of which to the chuck will be described hereinafter.

In the normal cumbent position of the particular bottle B about to undergo decoration, the base portion of the same occupies a position in close proximity to the cup-shaped chuck 63 with the extreme lower edge of the periphery of the base portion overlying the extreme lower edge of the periphery or rim of the chuck 63. The cradle member 35 supports the body of the bottle at a point near the center of gravity thereof on the base side thereof. It will be seen therefore that elevation of the neck portion of the bottle B will tend to align the bottle with the chuck in such a manner that upon application of a vacuum to the chuck, the base of the bottle will be drawn into the cup portion of the chuck and firmly held thereagainst. In the elevated or inclined position of the bottle, when held in the chuck 63, the tapered or shoulder portion of the bottle is brought to bear against the stencil screen S in the manner shown in Fig. 4.

Referring now to Figs. 4, 6, 7, 8 and 9, in order to elevate the bottle neck of each successive bottle B brought into position beneath the screen S, a bottle neck engaging arm 75 having fingers 76 formed thereon adapted to engage the bottle neck, is pivoted between the furcations of a bifurcated extension 77 provided on a plunger 78 which is connected to a piston 78' operatively disposed for reciprocation in a cylinder 79, the lower end of which is pivoted as at 80 to the stationary framework 20 of the apparatus. A stationary bracket 81 of substantially rectangular formation is secured to the platform 21. The sides of the bracket 81 are slotted as at 82 to receive therein a pair of oppositely directed pins 83 formed on the outer ends of the furcations of the extension 77. A pair of spaced guide members 84 extend between the sides of the bracket 81, the arm 75 passing between and being guided by these members. From the above description it will be seen that as the plunger 78 is extended from the cylinder 79, the extension 77 together with the arm 75 will move upwardly. The upper portions of the slots 82 are offset from the lower portions thereof in such a manner that upon upward movement of the extension 77, the lower end of the arm 75 will be moved upwardly and toward the bottle in the path indicated by the arrow in Fig. 4. As the arm 75 moves upwardly it engages the rim of the bottle and elevates the neck end thereof, while at the same time it forces the bottle onto the chuck 63 simultaneously with the application of a vacuum to the latter. The shoulder portion of the bottle is thus brought to bear against the underneath side of the screen preparatory to synchronized oscillation of the screen and bottle. In order to limit the upward movement of the bottle neck and prevent undue pressure between the screen and shoulder portion of the bottle, an abutment or limit stop 171 (Fig. 4) is positioned in the path of movement of the bottle neck and consists of a bifurcated bracket 172, the arms of which carry at their lower end, rollers 173 designed for engagement with the bottle neck. The bracket 172 is carried at the outer end of an arm 174 which is adjustably mounted in a block 175 which is in turn mounted on a slide member 176 that is vertically adjustable on a guide rod 177 by means of an adjusting screw 178.

Oscillation of the screen frame 49 and oscillation of the bottle B about its longitudinal axis when supported in the chuck 63, are synchronized by providing driving connections between the screen frame and the chuck. These connections consist of a train of gears 86 (Fig. 4) connecting the shaft 47 upon which the spider 48 is mounted with a vertical shaft 87 which is in turn connected through bevel gears 88 to a horizontal shaft 89 suspended by means of brackets 90 from the platform 21. A cord 91 extends around the pulley 74 and around a pulley 92 provided on the shaft 89, idler pulleys 93 (Fig. 2) being provided for the purpose of taking up any slack existing by virtue of the inclination of the chuck assembly 23. It is apparent that oscillation of the shaft 89 will impart oscillatory movement to the chuck 63 through the cord 91 and at the same time will impart oscillatory movement to the stencil screen frame 49 through the bevel gears 88, shaft 87 and gears 86. The various driving connections just referred to are designed according to engineering practice in such a manner that a rolling contact is effected between the surface of the bottle B and the underneath surface of the screen with no slipping of one of these surfaces on the other.

In order to oscillate the shaft 89 and impart synchronized oscillatory movement to both the stencil screen frame 49 and the chuck 63, a gear 95 is mounted on one end of the shaft 89. The gear 95 meshes with an elongated rack 96 (Figs. 2, 4 and 17) provided on a longitudinally slidable reciprocative carriage 97. The carriage 97 is provided with a central longitudinal plunger 98 having a piston 99 mounted thereon medially of its ends. The piston 99 is disposed within a cylinder 100 supported from the stationary framework 20 of the apparatus. Upper and lower grooves 101 and 102 formed in the housing of the cylinder 100 provide slideways for guiding the carriage 97 in its reciprocation. The cylinder 100 is provided with ports 103 and 104 adjacent the ends thereof for the admission of pressure fluid (compressed air being employed in the present instance) to aid the exhaust of pressure fluid from the ends of the cylinder in the manner presently to be described.

In order to reciprocate the carriage 97 and cause synchronized oscillation of the stencil screen frame 49 and chuck 63, air under pressure is alternately supplied to the opposite ends of the cylinder 100 by way of branch conduits 110 (Fig. 17) leading from a main supply line 111. Means is provided for alternately relieving the full pressure of air maintained in each end of the cylinder 100 to cause reciprocation of the piston 99.

Toward this end, the branch conduits 110 are connected by way of conduits 112 to an automatically actuated relief valve 113, the sole function of which is to open the conduits 112 alternately to atmosphere. A pair of pressure reducing orifice plates are disposed in the conduits 110 to permit the sudden pressure drop at either end of the cylinder 100 that is necessary for actuation of the piston 99 to occur.

The relief valve 113 is shown in detail in Figs. 10, 11 and 12, and includes a rotor 115 disposed within a housing 116 and carried by a shaft 117 which at its outer end is operatively connected to a holding ratchet and pawl mechanism 118 designed to hold the shaft and rotor in any of a number of positions. The shaft and rotor are advanced or rotated in a step by step fashion by means of a ratchet 119 pinned to the shaft 117 and a pawl 120 engaging the ratchet and carried by a lever 121. The lever 121 is connected by a link 122 to the plunger 78 of the bottle neck elevating mechanism previously described.

The rotor 115 is provided with four ports 123 which are spaced about the rotor near the periphery thereof ninety degrees apart. The ports are adapted to be brought into register one at a time with exhaust ports 124 leading to the atmosphere. The exhaust ports 124 are spaced apart one hundred and thirty-five degrees and consequently one or another of the ports 123 is alternately brought into register with the ports 124. The ports 124 are in alignment with a pair of intake ports 125 with which the conduits 112 are connected.

As one or the other of the conduits 112 are opened to the atmosphere through the relief valve 113, a sudden pressure drop occurs in the corresponding branch conduit 110 and in the end of the cylinder 100 to which it is connected. Because of the full line pressure maintained in the other end of the cylinder, the piston will be moved toward that end of the cylinder from which air is exhausted.

The carriage 97 (Fig. 17) is provided with an abutment 126 at each end thereof. The abutments 126 are adjustable longitudinally of the carriage by means of adjusting screws 127. A pair of identical control valves 128 are mounted on brackets 129 (Fig. 4) carried by the framework 20 of the apparatus. The control valves 128 are adapted to be alternately actuated by the abutments 126 on the reciprocating carriage 97 as the carriage reaches one or the other of its limiting positions. The function of the control valves 128 is two-fold, namely, to intermittently apply or shut off the vacuum to the chuck 63 and to intermittently supply pressure fluid to the cylinder 48' to index the conveyor 30 in the manner previously described.

One of the control valves 128 is shown in detail in Figs. 13, 14, 15 and 16, and consists of a housing 130 provided with a port 131 connected to a conduit 132 leading to a source of vacuum, and with a port 133 connected to a conduit 134 leading to a vacuum valve 150 (Fig. 17) by means of which vacuum is applied directly to the chuck 63 from either of the control valves 128. A slide 135, having a port 136 therein which is normally in communication with the ports 131 and 133, is disposed within the housing 130. The slide 135 is held in a position wherein the ports 131, 136 and 133 are in communication by means of a spring 137 mounted on a plunger 138 which is connected to and controls the operation of the slide 135 and which projects from the housing 130 in the path of one of the abutments 126.

The valve housing 130 is provided with an intake port 139 connected through conduits 140 and 141 to the source 111 of compressed air. An exhaust port 142, connected through a conduit 143 to the cylinder 48' on the underneath side of the piston 47', is in alignment with the port 139. A slide 144 having a port 145 therein which is normally out of register with the ports 139 and 142, is disposed within the housing 130. The port 145 is adapted to be moved into register with the ports 139 and 142 but is normally maintained out of register therewith by means of a spring 146 mounted on a plunger 147 which is connected to and controls the operation of the slide 144 and which projects from the housing 130 in the path of one of the abutments 126.

Upon completion of each decorating operation, as the carriage 97 reaches the end of its stroke in either direction, one or the other of the abutments 126 engages the plungers 138, 147 of the respective valve 128, and by depressing the same against the action of the springs 137, 146, discontinues communication between the lines 132 and 134, thus shutting off the application of vacuum to the chuck 63 through the vacuum valve 150. At the same time, communication is established from the source of air supply through the lines 141, 140 and 143 to the cylinder 48' to index the conveyor 30 in the manner previously described to move an undecorated bottle B into position beneath the stencil screen S.

The vacuum valve 150 is identical with the relief valve 113 previously described. Its sole function is to alternately establish communication between a manifold conduit 152 and one of the other of the two conduits 134 leading from the respective control valves 128 in order that vacuum may be applied to the chuck 63 by way of either valve 128. The valve operates or is indexed in a manner similar to the indexing of the valve 113 through a link 151 (Fig. 17) connected to the plunger 78 of the bottle neck elevating mechanism, each indexing operation serving to open the manifold conduit 152 leading from the chuck 63 to a supply of vacuum obtained from one or the other of the conduits 134.

In order to actuate the bottle neck elevating mechanism previously described to bring the shoulder portion of the bottles B undergoing decoration into engagement with the underneath side of the screen S and at the same time actuate the vacuum valve 150 and relief valve 113 through the medium of the links 122 and 151, means is provided for introducing compressed air to the underneath side of the piston 78' in the cylinder 80. Toward this end, a bell crank lever 155 loosely pivoted on the conveyor shaft 26, has a short arm 156 pivotally connected to the plunger 46' of the conveyor indexing mechanism and is provided with a long arm 157 having an abutment 158 mounted thereon adjacent its outer end. A control valve 159 is provided with a housing 160 which is suitably secured to the framework 20 of the apparatus. The housing 160 is provided with an internal valve seat 161 having disposed thereon a cooperating valve 162 provided with a valve stem 163 which projects through the housing 160 in the path of the abutment 158. A spring 164 normally holds the valve 162 on its seat. Compressed air is supplied to the housing 160 on one side of the valve 162 through the conduit 141 and conduits 165, 166. A conduit 167 connects the cylinder 80 on the underneath side of the piston 78' with the housing 160 on the other side of the valve 162. It will be seen that at the completion of each indexing operation of the conveyor 30, the abutment 158 engages the projecting valve stem 163 to open the control valve 159 and establish communication between the conduits 166 and 167, thus supplying compressed air to the cylinder 80 to actuate the bottle neck mechanism in the manner previously described.

The conduit 141 leading from the source 111 of compressed air is connected through a conduit 168 to the cylinder 80 above the piston 78' in order that the piston may be returned to its lowermost position when the source of compressed air applied to the cylinder on the underneath side of the piston is cut off by the valve 159. Similarly, the conduit 141 is connected through the conduit 165 and a conduit 169 to the cylinder 48' above the piston 47' to restore the latter to its lowermost position when the source of compressed air in the conduit 143 is cut off by either of the control valves 128.

In the operation of the apparatus, bottles or other articles to be decorated are fed to the conveyor 30 by the feeding mechanism 40 (Fig. 1) and are individually received in a cumbent position by the cradle-like members 35 and 36. As the carriage 97 (Fig. 17) periodically reaches the end of its stroke in either direction, one or the other of the abutments 126 engages the pair of plungers 138 and 147 which projects into its path and, as the ports 139 and 145 come into register, compressed air is conducted through the lines 141, 140 and 143, to the underneath side of the piston 47' in the cylinder 48'. Upward movement of the piston 47' causes the indexing mechanism 37 to be actuated in the manner previously described to advance the conveyor 30 and bring a bottle B into position beneath the stencil screen S.

Depression of the plunger 138 by the abutment 126 causes the ports 131 and 136 to be moved out of register so that the vacuum supply to the chuck 63 through the lines 132, 134, vacuum valve 150, and line 152 is interrupted.

Upon completion of the indexing operation, the abutment 158 on the arm 155 engages the valve stem 163 and raises the valve 162 from its seat, thus permitting compressed air to pass from the source 111 through the lines 141, 165, 166 and 167 to the underneath side of the piston 78' in the cylinder 79.

Elevation of the piston 78' throws the bottle neck elevating mechanism (shown in detail in Figs. 6, 7, 8 and 9) into operation in the manner previously described to raise the neck end of the bottle from its seat on the cradle member 36. Simultaneously, the links 122 and 151 are actuated to index the relief valve 113 and the vacuum valve 150 respectively.

Normally, air under full line pressure is maintained at both ends of the cylinder 100 by means of the branch lines 110. Indexing of the relief valve 113 permits evacuation of the full line pressure maintained in one end or the other of the cylinder 100 through either of the lines 112 and its corresponding exhaust port 124. The consequent reduction in pressure at one end of the cylinder 100 causes the piston 99 to be moved toward the end of the cylinder 100 which is evacuated, thus moving the carriage 97 to the opposite end of the cylinder.

As the abutment 126 releases the plungers 138 and 147 of either relief valve 128, the ports 131 and 136 come into register and vacuum is applied to the chuck 63 through either of the lines 132, 134, vacuum valve 150 (which has been indexed to its open position by the link 151) and line 152. The base of the bottle B, the neck of which is held in its elevated position by the bottle neck elevating mechanism, is drawn into the chuck 63 and the bottle is securely held by the chuck 63 in operative decorating position with the tapered or shoulder portion thereof in engagement with the underneath side of the screen S.

During the movement of the carriage 97 as just described, an oscillation is imparted to the stencil screen frame 49 and chuck 63 simultaneously by means of the driving connections shown in Fig. 4 and previously described. Decorating material is forced through the screen S by means of the tiltable squeegee S' and onto the bottle to complete the decoration thereof.

Upon completion of the stroke of the carriage 97, the plungers 138 and 147 on the other relief valve 128 are depressed and as the ports 131 and 136 are moved out of register, the vacuum supply through the lines 132, 134, vacuum valve 150 and line 152 is cut off. The bottle B which has just been decorated is returned to its cumbent position on the cradle-like supports 35 and 36, and as the ports 139 and 145 of the relief valve 128 are brought into register, the conveyor is indexed and the entire operation repeated. In due course of time, the decorated bottles reach the extreme end of the conveyor 30 adjacent the indexing mechanism 37 and, at this point, they may be removed manually or automatically and placed in an upright position on the conveyor 170 for treatment in a drying oven.

Modifications may be resorted to within the spirit and scope of the appended claims.

I claim:

1. In an apparatus for decorating the shoulder portions of bottles, a conveyor adapted to receive thereon the bottles to be decorated in a cumbent position, a flat stencil screen oscillatable in its own plane, a squeegee therefor for decorating the shoulder portions of said bottles, means for indexing said conveyor in a step by step fashion to bring said bottles successively into the proximity of said stencil screen, means for successively moving said bottles bodily into juxtaposition with said screen, with the shoulder portions thereof in contact with said screen, and means for oscillating said screen alternately in opposite directions upon completion of successive indexing operations.

2. In an apparatus for decorating the tapered sides of receptacles, a conveyor adapted to receive thereon the receptacles to be decorated in a cumbent position, a flat stencil screen oscillatable in its own plane, a squeegee therefor for decorating the tapered sides of said receptacles, means for repeatedly indexing said conveyor in a step by step fashion to bring said receptacles successively into the proximity of said stencil screen, means operable upon completion of each indexing operation for moving said receptacles into juxtaposition with said screen, with the shoulder portions thereof in contact with said screen, and means for oscillating said screen alternately in opposite directions upon completion of successive indexing operations.

3. In an apparatus for decorating cylindrical or frusto-conical sides of receptacles, a conveyor adapted to receive thereon the receptacles to be decorated in a cumbent position, a movable stencil screen and a squeegee therefor for decorating the sides of said receptacles, means for repeatedly indexing said conveyor in a step by step fashion to bring said receptacles successively into the proximity of said stencil screen, pneumatic means controlled by said indexing means and operable upon completion of the indexing operation for moving said receptacles bodily into juxtaposition with said screen, with the sides thereof in contact with said screen, and means for moving said screen.

4. In an apparatus for decorating the shoulder portions of bottles, a conveyor adapted to receive the bottles to be decorated in a cumbent position thereon, a flat stencil screen oscillatable in its own plane, a squeegee therefor for decorating the shoulder portions of said bottles, means for indexing said conveyor in a step by step fashion to bring said bottles successively into the proximity of said stencil screen, an oscillatable chuck adapted to receive therein the base portions of said bottles to hold the bottles in an inclined position with the shoulder portions thereof in contact with said screen, means operable upon indexing of said conveyor for delivering said bottles to said chuck, and means for oscillating said stencil screen and chuck in synchronism alternately in opposite directions upon completion of successive indexing operations.

5. In an apparatus for decorating the shoulder portions of bottles, a conveyor adapted to receive thereon the bottles to be decorated in a cumbent position, an oscillatable stencil screen and a squeegee therefor for decorating the shoulder portions of said bottles, means for indexing said conveyor in a step by step fashion to bring said bottles successively into the proximity of said stencil screen, an oscillatable chuck adapted to receive therein the base portions of said bottles to hold the bottles in an inclined position with the shoulder portions thereof in contact with said screen, means operable upon indexing of said conveyor for delivering said bottles to said chuck, means for applying a vacuum to said chuck to maintain the bottles in position therein, and means for oscillating said stencil screen.

6. In an apparatus for decorating the shoulder portions of bottles, a conveyor adapted to receive thereon the bottles to be decorated in a cumbent position, a flat horizontal stencil screen oscillatable in its own plane, a squeegee therefor, an inclined oscillatable chuck adapted to receive the bottles therein to hold the same in an inclined position with the shoulder portions thereof in contact with the underneath side of said stencil screen, means for indexing said conveyor in a step by step fashion to bring said bottles successively into proximity with said chuck, means operable upon completion of each indexing operation for delivering a bottle from said conveyor to said chuck, means for oscillating said screen and chuck in synchronism, alternately in opposite directions upon completion of successive indexing operations to apply a decoration to the shoulder portion of the bottle held by said chuck, and means for restoring the bottles delivered to said chuck to said conveyor after application of the decoration thereto.

7. In an apparatus for decorating the shoulder portions of bottles or like articles, a conveyor adapted to receive thereon the bottles to be decorated in a cumbent position, a horizontal oscillatable stencil screen and a squeegee therefor, an inclined oscillatable chuck adapted to receive the base portions of said bottles therein to support the bottles in an inclined decorating position with the shoulder portions thereof in contact with the underneath side of said screen, said chuck forming the sole support for said bottles when the same are in decorating position, means for delivering said bottles from said conveyor successively to said chuck, and means for oscillating said stencil screen and chuck in synchronism.

8. In an apparatus for decorating the shoulder portions of bottles, a conveyor adapted to receive the bottles to be decorated thereon in a cumbent position, a stencil screen positioned above said conveyor, a squeegee therefor, said conveyor being adapted to move said bottles in their cumbent position successively beneath said screen, means for successively elevating the neck portions of said bottles on said conveyor to tilt the bottles and bring the shoulder portions thereof into contact with said screen, an abutment positioned in the path of movement of said neck portions to limit their upward movement, and a chuck for holding the bottles in their tilted position.

9. In an apparatus for decorating the shoulder portions of bottles, a conveyor adapted to receive the bottles to be decorated thereon in a cumbent position, a stencil screen positioned above said conveyor, a squeegee therefor, said conveyor being adapted to move said bottles in their cumbent position successively beneath said screen, a rotatable chuck positioned beneath said screen, said chuck being adapted to receive the base portions of said bottles and form the sole support in maintaining said bottles in decorating position against said screen, and means for delivering said bottles successively to said chuck.

10. An apparatus for decorating the shoulder portions of bottles comprising an endless conveyor adapted to receive the bottles to be decorated in a horizontal position thereon, a horizontal oscillatable stencil screen positioned above said conveyor, a squeegee therefor, an inclined oscillatable chuck adapted to receive therein the base portions of said bottles to form the sole support in holding said bottles in an inclined position with the shoulder portions thereof in contact with said screen, an indexing mechanism for moving said conveyor in step by step fashion to bring the bottles on said conveyor successively into proximity with said chuck, means for elevating the neck portions of said bottles to align said bottles with said chuck, means for applying a vacuum to said chuck to draw the base portions of said bottles into said chuck, a cylinder, a piston reciprocable in said cylinder, a rack movable with said piston, reciprocation of said rack being synchronized with the oscillation of said screen and chuck, means for admitting compressed air to both ends of said cylinder, a relief valve actuated by said elevating means for alternately relieving the pressure of air at opposite ends of said cylinder to reciprocate said piston, a control valve actuated by said indexing mechanism for actuating said elevating means, and a pair of control valves actuated by said rack for controlling said vacuum applying means and said indexing means.

11. An apparatus for decorating the shoulder portions of bottles or like articles comprising a conveyor adapted to receive the articles thereon, an oscillatable stencil screen, a squeegee therefor, an oscillatable chuck adapted to receive therein the articles to form the sole support therefor in holding the same against said screen, an indexing mechanism for moving said conveyor in step by step fashion to bring the articles on said conveyor successively into proximity with said chuck, means for aligning said bottles with said chuck, means for applying a vacuum to said chuck to draw the articles thereagainst, a cylinder, a piston reciprocable therein, a rack movable with said piston, reciprocation of said rack being synchronized with oscillation of said screen and chuck, means for admitting pressure fluid to both ends of said cylinder, a relief valve actuated by said aligning means for alternately relieving the pressure of said fluid at opposite ends of said cylinder to reciprocate said piston, a control valve actuated by said indexing mechanism for actuating said aligning means, and a pair of control valves actuated by said rack for controlling said vacuum applying means and said indexing means.

12. In an apparatus for decorating the sides of receptacles, a conveyor adapted to receive thereon the receptacles to be decorated in a cumbent position, a movable stencil screen and a squeegee therefor for decorating the sides of the receptacles, means for indexing said conveyor in a step by step fashion to bring said receptacles successively into the proximity of said stencil screen, a chuck adapted to receive therein the base portions of said receptacles to hold the same in decorating position with the sides thereof in contact with said screen, means operable upon indexing of said conveyor for delivering said receptacles to said chuck, means for applying a vacuum to said chuck to maintain the receptacles in position therein, and means for moving said stencil screen.

13. In an apparatus for decorating the shoulder portions of bottles, a conveyor adapted to receive thereon the bottles to be decorated in a cumbent position, a stencil screen designed for tangential rolling line contact with the shoulder portions of the bottles along a substantially horizontal line, a squeegee therefor, an inclined chuck adapted to receive the base portion of the bottles therein to hold the bottles in an inclined position with the shoulder portions thereof in contact with the underneath side of said screen, means for indexing said conveyor in a step by step fashion to bring the bottles successively into proximity to said stencil screen, means operable upon indexing of said conveyor for elevating the neck portions of the bottles to tilt the bottles and align the same with said chuck and for subsequently delivering the bottles to said chuck, and means for moving said screen.

14. An apparatus for decorating the shoulder portions of bottles comprising a conveyor adapted to receive thereon the bottles to be decorated in a horizontal position, an oscillatable stencil screen positioned above said conveyor, a squeegee therefor, pneumatic means for repeatedly indexing said conveyor in a step by step fashion to bring said bottles successively into the proximity of said stencil screen, an inclined chuck adapted to receive the base portion of the bottles therein to hold the bottles in an inclined position with the shoulder portions thereof in contact with said screen, a reciprocable carriage, pneumatic means for successively elevating the neck portions of said bottles on the conveyor to tilt the bottles and deliver the same to said chuck, and means operable upon reciprocation of said carriage for actuating both of said pneumatic means.

15. In an apparatus for decorating the shoulder portions of bottles, a conveyor adapted to receive the bottles to be decorated in a cumbent position thereon, a stencil screen positioned above said conveyor and a squeegee therefor, an inclined chuck adapted to receive therein the base portion of the bottles and form the sole support therefor in maintaining said bottles in decorating position against said screen, means for successively tilting said bottles to align the same with said chuck, and means for applying a vacuum to said chuck.

WARREN R. SIMONTON.